United States Patent Office 3,637,591
Patented Jan. 25, 1972

3,637,591
EPOXY RESIN COMPOSITIONS
Aubert Y. Coran, Akron, Ohio, assignor to Monsanto Company, St. Louis, Mo.
No Drawing. Continuation of abandoned application Ser. No. 823,957, May 12, 1969, which is a continuation-in-part of abandoned application Ser. No. 791,792, Feb. 9, 1959. This application Apr. 27, 1970, Ser. No. 32,417
Int. Cl. C08g 30/02, 30/04, 45/00
U.S. Cl. 260—47 EC  17 Claims

ABSTRACT OF THE DISCLOSURE

An epoxide resin composition suitable for curing and a process for preparing the same are provided wherein a neutral ester of a phosphorous acid is incorporated in a mixture of an epoxide resin and a curing agent free from a $BF_3$-organic base complex.

---

This invention relates to novel resinous compositions of matter and to their preparation. More particularly, it relates to certain epoxide compositions and reaction products and articles and products made therefrom. This application is a continuation of application Ser. No. 823,957, filed May 12, 1969, now abandoned, which in turn is a continuation in part of application Ser. No. 791,792, filed Feb. 9, 1959, and now abandoned, which in turn was a continuation in part of application Ser. No. 657,981, filed May 8, 1957 and now abandoned.

Epoxide resins in recent times have come to new heights in fields of application as lamination, surface coatings, adhesives, and electrical potting compounds. In certain applications the technique involved is the addition of curing agent to an epoxide resin, followed by lay-up and curing, either at room temperature or at elevated temperatures. Most of the epoxide resins are solids or extremely viscous liquids at room temperature. In order for the initial composition to have a workable fluid consistency, it is necessary to add some other ingredient so that the viscosity is sufficiently low to permit easy and efficient handling. To obtain such fluidity there may be added nonvolatile solvents such as dibutyl phthalate, di-n-octyl phthalate, dioctyl adipate, tricresyl phosphate, methyl acetyl ricinoleate, etc.; however, the incorporation of these substances has various deleterious effects on the cured material. In compositions suitable for use in the electrical field, the incorporation of such materials adversely affects the electrical properties of the cured material.

Certain liquid reactive solvents are known to be useful, e.g., liquid compounds containing a 1,2-epoxy group or groups, such as styrene oxide, butadiene monoxide, phenyl glycidyl ether or glycidyl ethers, of polyhydric alcohols, such as ethylene glycol, diethylene glycol, propylene glycol, or glycerol. These compounds, however, adversely affect the compressive strength properties of the cured material.

Moreover, such modified or unmodified epoxide resins undesirably support combustion, or, in other words, have poor flame-retardant properties.

One of the objects of the present invention is the production of infusible and insoluble reaction products of complex epoxides and curing agents in suitable proportions which have remarkable chemical resistance combined with hardness, toughness, flexibility, lack of contraction on conversion, improved compressive strength, and other desirable properties.

Another object is to provide epoxide compositions which have low initial viscosities and are capable of use as raw materials for the production of such reaction products.

Another object is the production of epoxy compositions for use in making protective coatings, impregnating solutions, adhesives, films, filaments and the like.

Another object of the invention is the production of molding mixtures and compositions capable of conversion into infusible, molded articles and products, and the articles and products so produced.

Another object is to provide such articles and products which have improved fire-retardant properties.

Other objects of the invention and the nature and advantages of the invention will appear from the following more detailed description.

In accordance with this invention it has been found that improved epoxide resin compositions are obtained by incorporating therein a neutral ester of a phosphorous acid, hereinafter referred to for convenience as a "phosphite ester." By the term "a neutral ester of a phosphorous acid" is meant esters of a phosphorous acid having three divalent chlakogen (oxygen, sulfur, selenium and tellurium) atoms attached to the phosphorus atom, at least two of the divalent chalkogen atoms also being attached to the same organic radical or to separate radicals and which may be like or unlike, any remaining chalkogen radical being attached to a hydrogen atom, e.g., phosphites, phosphorothioites, phosphorodithioites, phosphorotrithioites, hydrogen phosphites, di- or polyphosphites, etc.

Phosphite esters having the following structure

wherein X is a divalent chalkogen atom having an atomic weight of less than 35, i.e. oxygen or sulfur and $R_1$ and $R_2$ are like or unlike organic radicals, e.g. aromatic, aliphatic, alicyclic radicals and $R_3$ is hydrogen or an organic radical, represent a preferred class of phosphite esters which are contemplated within the broad scope of this invention. For example, the aromatic radicals may be aryl radicals such as phenyl, tolyl, ethylphenyl, nonylphenyl, decylphenyl, 2,4 - dibutylphenyl, 2 - methyl - 3 - ethylphenyl, cumyl, xenyl, naphthyl, and the like, or aralkyl radicals such as methyl, ethyl, isopropyl, butyl, isoamyl, hexyl, and the like; the aliphatic radicals may be alkyl radicals such as methyl, ethyl, isorpropyl, butyl, isoamyl, hexyl, heptyl, 2-ethylhexyl, nonyl, isodecyl, dodecyl, and the like, or alkenyl radicals such as propynyl, butynyl, pentynyl and the like; the alicyclic radicals may be cycloalkyl radicals such as cyclopentyl, cyclohexyl, cycloheptyl, or cycloalkenyl radicals such as cyclopentenyl, cyclohexenyl, cycloheptenyl, and the like; etc.

The aforementioned radicals may also be substituted by one or more substituents. Typical, but not limitative of such substituents are the halogens, such as chlorine, bromine, iodine and fluorine; alkoxy groups such as methoxy, ethoxy, propoxy, butoxy, ethoxybutoxy, etc.; one or more hydroxy groups, etc.

It is preferred that the divalent X radical in the above formula be an oxygen atom and that the $R_1$, $R_2$ and $R_3$ radicals each be an aryl hydrocarbon radical containing from 6 to 15 carbon atoms. Triphenyl phosphite is particularly preferred, as will be apparent from the detailed description of the invention.

As exemplary of other classes of phosphite esters included within the scope of the term "a neutral ester of a phosphorous acid" there may be mentioned the cyclic organic phosphites, such as those obtained by the reaction of an arylene dichlorophosphite with a glycol having adjacent hydroxyl groups, these compounds and the preparation thereof are more completely described in U.S. 2,839,563; also the cyclic organic phosphites obtained by the reaction of a diol with a triaryl phosphite, said process being more completely described in U.S. 2,834,798; alkanolamine phosphites as are obtained by the partial transesterification of a tertiary aromatic phosphite, said process being more completely described in U.S. 2,841,607; tetra-aromatic alkylene phosphites obtained by the reaction of 2 mols of an appropriate secondary aromatic monochlorophosphite with a vicinal glycol in the presence of two mols of a tertiary base, e.g. see U.S. 2,841,606; a pentaerythritol phosphite derivative as is described in U.S. 2,847,443; etc.

The phosphite esters contemplated by the term "a neutral ester of a phosphorous acid," are for the most part obtained by the reaction of an appropriate hydroxy or thiol compound with phosphorous trihalide in the presence or absence of a hydrogen halide acceptor. It is preferred that the hydroxy compound, e.g. the aliphatic alcohol, aromatic alcohol, phenol or the thiol compound, e.g. aliphatic thioalcohol (mercaptan), aromatic thioalcohol (mercaptan), etc., have an acid dissociation constant (Ka) above about $1 \times 10^{-13}$, in that especially desirable results are obtained when the (R—X—) moiety of the phosphite ester is derived from a hydroxy or thiol compound which has an acid dissociation constant above this value.

Glycidyl polyethers, ethoxyline, epoxy or epoxide resins, as they are variously called, are well known to those skilled in the art. The epoxide resins useful in the compositions and methods of this invention are those organic compounds containing at least one 1,2-epoxy group, i.e.

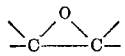

These compounds may be saturated or unsaturated, aliphatic, cycloaliphatic, aromatic or heterocyclic and may contain substituents such as halogen atoms, OH groups, ether radicals and the like.

Generally, such epoxide resins comprise a polyether derivative of a polyhydric organic compound, said derivative containing 1,2-epoxy groups and said compound being selected from the group consisting of polyhydric alcohols and phenols containing at least two phenolic hydroxy groups.

Among the polyhydric phenols which may be used in preparing such glycidyl polyethers are the mononuclear phenols such as resorcinol, catechol, hydroquinone, etc. and the polynuclear phenols, such as bis(4-hydroxyphenyl)-2,2-propane,
4,4'-dihydroxybenzophenone,
bis-(4-hydroxyphenyl)-1,1-ethane,
bis(4-hydroxyphenyl)-1,1-isobutane,
bis(4-hydroxyphenyl)-2,2-butane,
bis(4-hydroxy-2-methylphenyl)-2,2-propane,
bis(4-hydroxy-2-tertiary butylphenyl)-2,2-propane,
bis(4-hydroxy-2,5-dichlorophenyl)-2,2-propane,
4,4'-dihydroxybiphenyl,
4,4'-dihydroxypentachlorobisphenyl,
bis(2-hydroxynaphthyl)-methane,
1,5-dihydroxy naphthalene,
phloroglucinol,
1,4-dihydroxynaphthalene,
1,4-bis-(4-hydroxyphenyl) cyclohexane, etc.

as well as other complex polyhydric phenols such as pyrogallol, phloroglucinol and novalac resins from the condensation of a phenol with an aldehyde in the presence of an acidic condensation catalyst. For the nature and preparation of novalac resins, see the book by T. S. Carswell, "Phenoplasts," 1947, page 29, et seq.

The preferred polynuclear phenol is bis(4-hydroxyphenyl)-2,2-propane, known in the trade as Bisphenol-A.

In admixture with the named polynuclear phenols, use also may be made of those polynuclear phenols wherein the phenol nucleii are joined by sulfur bridges, as for example, in 4,4'-dihydroxydiphenyl sulfone.

Less preferably, there can be used 1,2-epoxy containing polyethers of aliphatic polyhydric alcohols, such as the polyglycidyl ethers thereof, as for example, the diglycidyl ethers of ethylene glycol, propylene glycol, trimethylene glycol, triethylene glycol, butylene glycol, diethylene gycol, 4,4'-dihydroxydicyclohexyl, glycerol, dipropylene glycol and the like, as well as ethers containing more than two glycidyl groups such as the glycidyl polyethers, glycerol, mannitol, sorbitol, polyallyl alcohol, polyvinyl alcohol and the like. Such glycidyl polyethers aso have a 1,2-epoxy value greater than 1.0.

These epoxide resins, or glycidyl polyethers as they are frequently called, may be prepared by reacting predetermined amounts of at least one polyhydric compound and one epihalohydrin in an alkaline medium.

While it is preferred to use epichlorohydrin as the epihalohydrin in the preparation of the epoxide starting materials of the present invention, other epihalohydrins such as epibromohydrin may be used advantageously.

In the preparation of the epoxide resins, aqueous alkali is employed to combine with the halogen of the epihalohydrin. The amount of alkali employed should be substantially equivalent to the amount of halogen present and, preferably, should be employed in an amount somewhat in excess thereof. Aqueous mixtures of alkali metal hydroxides, such as potassium hydroxide and lithium hydroxide, may be employed; although for economic reasons, sodium hydroxide is obviously preferred.

The product of the above described reaction instead of being a single simple compound is generally a complex mixture of glycidyl polyethers, but the principal product may be represented by the formula

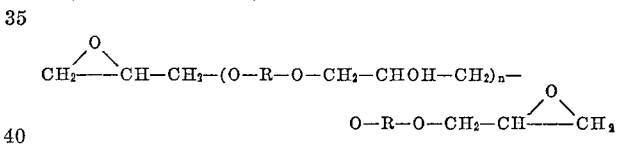

wherein $n$ is an integer of the series 0, 1, 2, 3 . . ., and R represents a divalent hydrocarbon radical of a polyhydric compound and preferably a dihydric phenol. While for any single molecule $n$ is an integer, the fact that the obtained polyether is a mixture of compounds causes the determined value for $n$, e.g. from molecular weight measurement, to be an average which is not necessarily a whole number.

The epoxides suitable for use in this invention have a 1,2-epoxy equivalency greater than 1.0. By epoxy equivalency, reference is made to the average number of 1,2-epoxy groups

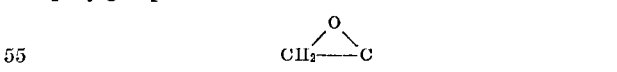

contained in the average molecule of the glycidyl ether. Owing to the method of preparation of the glycidyl polyethers and the fact that they are ordinarily a mixture of chemical compounds having somewhat different molecular weights and contain some compounds wherein the terminal glycidyl radicals are in hydrated form so that the epoxy equivalency of these compounds may be quite low and contain fractional values, and therefore the epoxy equivalency of the product is not necessarily an integer such as 2, 3, 4 and the like. The epoxide resin may, for example, have an equivalency of 1.5, 1.8, 2.5 and the like.

Epoxides are disclosed in various places in the art; among the references which may be mentioned are U.S. Pats. 2,324,483; 2,444,333; 2,494,295; 2,500,600; 2,503,726; 2,511,913; 2,518,056; 2,558,949; 2,579,698; 2,582,985; 2,592,560; 2,615,007; 2,615,008; and 2,633,458.

Many of the epoxide resins prepared by the above reaction are sold under trade names, as for example Epon resins by Shell Chemical Corporation or ERL resins by the Bakelite Division of Union Carbide and Carbon Corporation. Data on several types are given in Table I below:

TABLE 1

| Trade name number | Epoxide equivalent wt. | Viscosity,[1] 25° C. (Gardner-Holdt) | M.P. ° C. Durran mercury method |
|---|---|---|---|
| Epon 815 | 175–210 | 5–9 poises | Liquid |
| Epon 828 | 175–210 | 50–150 poises | 8–12 |
| ERL 2774 | 185–200 | 105–195 | 8–12 |
| Epon 834 | 225–290 | O–V | 20–28 |
| Epon 1001 | 450–525 | C–G | 64–76 |
| Epon 1004 | 870–1,025 | Q–U | 95–105 |
| Epon 1007 | 1,650–2,050 | Y–Z | 125–132 |

[1] The viscosities of Epon 815, Epon 828, and ERL 2774 are on pure resin, Epon 834 on 70% weight solution in butyl carbitol, and all other types on 40% weight solution in butyl carbitol.

The preferred polyethers are prepared from bis(4-hydroxyphenyl)propane and contain a chain of alternating glyceryl and 2,2-bis(4-phenylene) propane radicals separated by intervening ethereal oxygen atoms and have a 1,2-epoxy equivalency between 1 and 2, an epoxide equivalent weight of about 175 to 600, preferably from about 175 to 370. A particularly suitable material for use in the invention is the normally liquid glycidyl polyether of Bisphenol-A having an epoxide equivalent weight of about 175 to 220 and a 1,2-epoxy equivalency of about 1.8 to 1.95.

Another group of epoxide resins that may be used are those which are derived by the reaction of peracetic acid and unsaturated compounds. A typical member of this class is the epoxide resin derived from butadiene and crotonaldehyde which have undergone the Diels-Alder condensation and the Tischenko reaction:

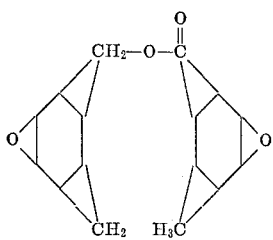

This compound is sold commercially as Epoxide 201 by Union Carbide Chemicals Company.

Still another group of epoxide resins are the polyepoxide polyesters which are prepared by epoxidizing the unsaturated portions of the tetrahydrophthalic residues in the polyester composition. These polyepoxide polyester compositions, as well as their preparation, are described in U.S. Pat. 2,847,394.

The hardening of epoxide compositions of this invention may be accomplished by the addition of any of the chemical materials known in the art for curing epoxide resins. Such materials usually referred to as curing agents but at times are designated as hardeners, activators or catalysts. While some curing agents promote curing by catalytic action; others participitate directly in the reaction and are absorbed into the resin chain. Depending upon the particular agent used, the curing may be accomplished at room temperature, with heat produced by exothermic reaction or by the application of external heat. Obviously, some of these agents are more suitable than others for a particular purpose; for example, certain liquid curing agents are suitable for improving the fluidity of the compositions as well as for performing the curing or hardening function.

Numerous examples of curing agents free from a $BF_3$-organic base complex which may be used with the compositions of this invention and which are known to those skilled in the art for curing epoxide resins are for example various amines such as aliphatic and aromatic primary, secondary and tertiary amines, e.g. diethylamine, mono-, di- and tri-butylamines, octylamine, dodecyl amine, cyclohexylamine, benzylamine, benzyl dimethyl amine, piperidine, piperazine, etc.; polyamines, e.g. m-phenylene diamine, p-phenylene diamine, 4,4'-methylene-dianiline, m-xylenediamine, 4,4'-diamino-diphenyl sulfone, 4,4'-methylene dianiline-diaminodiphenyl sulfone blend, m-phenylene diamine-diaminodiphenyl sulfone blends, ethylene diamine, N,N-diethylene diamine, diethylene triamine, triethylene tetramine, tetraethylenepentamine, pentaethylene diamine, etc.; oxy-amines such as ethanolamine, butanolamine, diethanolamine, triethanolamine, etc.; hydroxy-alkylated polyamines, such as 2-aminoethyl-ethanol-amine, N-hydroxyethyl-1,2-diamino propane, 1,3-diaminopropanol, N-hydroxypropyl - m - phenylene diamine, N-(2-hydroxypropyl)-ethylene diamine, N,N' - bis(hydroxyethyl) triethylene triamine, N-(hydroxyethyl) diethylene triamine, etc.; phenolic tertiary amines, such as dimethylamino-methylphenol, tris(dimethylaminomethyl)phenol, etc.; the salts of phenolic tertiary amines, such as the 2-ethylhexanoic acid salt of tris(methylaminomethyl)phenol, etc.; aliphatic amine-adducts, such as diethylene triamine 4,4'-isopropylene diphenol adduct, diethylene triamine/acrylonitrile adduct, acrylonitrile/tetraethylene pentamine adduct, etc.; cyanamide and its polymerization products, e.g. dicyandiamide; alcoholates of polyvalent metals, such as aluminum butylate, ferric butylate, and the like; amide type curing agents, including primary carboxylic acid amides and polyfunctional carboxylic acid amides, e.g. acetamide, adipamide, benzamide, diacetamide of hexamethylene diamine, mono-amides of the type described in U.S. 2,760,944, sulfonamides of the type described in U.S. 2,712,001, etc.; polyamides, e.g. the polyamide resins sold by General Mills under the Versamid trademark which may be used in such quantities that they function as flexibilizing modifiers, etc.; organic and inorganic acids and anhydrides, e.g. citric acid, acetic acid, aconitic acid, oxalic acid, succinic acid, succinic anhydride, dodecylsuccinic acid, lactic acid, maleic acid, maleic anhydride, fumaric acid, phthalic acid, phthalic anhydride, pyromellitic dianhydride, hexachloroendomethylene tetrahydrophthalic anhydride, hexahydrophthalic anhydride, methyl endomethylene tetrahydrophthalic anhydride, 1,2,4-butanetricarboxylic acid, isophthalic acid, tetrephthalic acid, acetoacetic acid, malonic acid, sulfonic acids, such as benzenesulfonic acid, phosphinic acids such as dibenzenephosphinic acid, and the like; and metal containing organic and inorganic compounds as zinc fluoborate, potassium persulphate, nickel fluoborate, copper fluoborate, selenium fluoborate, magnesium fluoborate, tin fluoborate, potassium perchlorate, cupric sulfate, cupric phosphate, cupric phosphite, colbaltous fluoborate, cobaltous fluosilicate, chromic sulfate, chromic sulfite, lead arsenite, lead borate, lead molybdate, magnesium sulfate, cadmium arsenate, cadmium silicate, silver chlorate, silver fluosilicate, strontium chlorate, aluminum phosphate, aluminum fluoborate, ferrous silicate, manganese hypophosphite nickel phosphate, and nickel chlorate.

The polyamine curing agents and the polycarboxylic acid anhydride curing agents are especially useful in the epoxide compositions of this invention.

A good many of the above-listed curing agents are liquids, and, as mentioned above, can serve the dual role of improving the fluidity and effecting cure. Some of these which are particularly useful in such a dual role are liquid polyamines, e.g. tetraethylene pentamine. It is often advantageous to use mixtures of different curing agents, sometimes a liquid and a solid agent or two liquid or two solid curing agents.

Effective concentrations of curing agents in the epoxy resin compositions of this invention vary in wide ranges depending on the particular epoxide and curing agent selected and the desired rate of cure. For the catalytic type curing agents the amount employed will usually vary from about 1 to about 20 parts per 100 parts by weight of the epoxide and more preferably from 1 part to 5 parts per 100 parts of the epoxide. It is generally suitable to use up to about 50 parts per 100 parts of epoxide of a polycarboxylic acid or anhydride, while in the case of an amine or amide type, from about 5 to about 20 parts per 100 parts by weight of epoxide are generally used. With the cross-linking amines, the customary method is to allow one epoxy group for each active hydrogen of the amine curing agent. Since the phosphorous containing modifier of this invention acts as a partial replacement for the amine curing agent, it is preferred to use less than a stoichiometric amount. Note for example (see Example 13) that with diethylene triamine it is only necessary to use 8 phr. (parts per hundred parts of epoxide resin) of the amine when 25 phr. of triphenyl phosphite is present, as contrasted with 12 phr. when no phosphite is present. Hence, one-third of a gram mole of phosphite replaces one gram mole of active hydrogen.

Various other ingredients may be mixed with the compositions of the present invention, including pigments, colors, fillers, resin stabilizers, flexibilizing modifiers and the like.

To illustrate the manner in which the invention is carried out, the following examples are given. It is to be understood, however, that the examples are for the purpose of illustration and the invention is not to be regarded as limited to any of the specific conditions recited therein. Unless otherwise specified, parts disclosed in the following examples are parts by weight.

EXAMPLE 1

The formulations listed below are prepared by adding the indicated amounts of phosphite ester and curing agent to 100 parts of epoxide resin. The resulting mixture is agitated thoroughly, poured into a plate glass mold coated with a standard mold release agent, and then cured for a short time. The hardness is then measured using a standard instrument manufactured by the Shore Instrument Company. The samples are then post cured (150° C. for 5 hours) and tested again for hardness. In some cases, the viscosity is measured after mixing of the three components to demonstrate the viscosity reduction attained in using reactive phosphite ester diluents. The compositions and the results obtained are reported in Table A.

TABLE A

| Formulation No. | Modifier | Amount, phr. | Curing agent | Amount, phr. | Epoxide resin (100 parts) | Viscosity [1] (cps. at 25° C.) | Hardness "D" scale Initial cure [2] | Hardness "D" scale After 5 hrs. at 150° C. |
|---|---|---|---|---|---|---|---|---|
| 1 | None | | TEPA | 8 | Epon 828 | 5,800 | 85 | 88 |
| 2 | TPP | 25 | TEPA | 8 | do | 1,350 | 87 | 89 |
| 3 | TAPP | 25 | TEPA | 8 | do | 5,300 | 85 | 88 |
| 4 | None | | DEAPA | 8 | do | 1,750 | 86 | 85 |
| 5 | TPP | 25 | DEAPA | 8 | do | 650 | 83 | 86 |
| 6 | TAPP | 25 | DEAPA | 8 | do | 1,550 | 83 | 85 |
| 7 | None | | PA | 40 | do | | 88 | 87 |
| 8 | TPP | 25 | PA | 40 | do | | 86 | 88 |
| 9 | TAPP | 25 | PA | 40 | do | | 86 | 85 |
| 10 | TPP | 5 | TEPA | 8 | do | 3,640 | 87 | 88 |
| 11 | TPP | 50 | TEPA | 8 | do | 560 | 82 | 88 |
| 12 | None | | TEPA | 8 | ERL 2774 | 6,550 | 85 | 87 |
| 13 | TPP | 25 | TEPA | 8 | ERL 2774 | 1,680 | 86 | 89 |
| 14 | None | | TEPA | 8 | Epon 815 | 870 | 52 | 88 |
| 15 | TPP | 25 | TEPA | 8 | do | 400 | 71 | 88 |
| 16 | BDP | 25 | TEPA | 8 | do | 770 | 83 | 65 |
| 17 | TCP | 25 | TEPA | 8 | do | 1,770 | 83 | 88 |
| 18 | TBP | 5 | TEPA | 8 | do | | 58 | 86 |
| 19 [3] | DBPh | 25 | TEPA | 8 | do | 1,550 | 10 | 48 |
| 20 [3] | 2-EP | 25 | TEPA | 8 | do | 1,300 | 5 | 38 |

[1] Brookfield spindle No. 4 at 60 r.p.m.
[2] The initial cure for phthalic anhydride-containing compositions is 150° C. for twenty-four hours, and for all others is 100° C. for thirty minutes.
[3] Conventional plasticizer.

NOTE.—Legend: TEPA—Tetraethylene pentamine; TPP—Triphenyl phosphite; TAPP—Tris-t-amyl phenyl phosphite; DEAPA—Diethylamino-propylamine; PA—Phthalic anhydride; BDP—Butyl diphenyl phosphite; TCP—Tricresyl phosphite; TBP—Tributyl phosphite; DBPh—Dibutyl phthalate; 2-EP—2-ethylhexyl diphenyl phosphate.

The results obtained in Table A indicate that for the most part the viscosities of the compositions containing a phosphite ester are appreciably lower than the controls (Formulation Numbers 1, 4, 12 and 14). This viscosity reduction is obtained without an adverse effect on the hardness of the cured product. In some instances, the hardness, after initial cure, of the epoxide composition containing the epoxide resin, curing agent and phosphite ester is much better than the control using the same epoxide resin and curing agent, as for example, Formulation No. 15, which has a hardness of 71, over Formulation No. 14, which has a hardness of only 52. The results obtained with Formulations 19 and 20, which contain conventional nonreactive plasticizers in place of the phosphite ester, illustrate the poor results obtained with respect to hardness of the final product after the initial cure and post cure.

Table B, following, shows the power factor and dielectric constant of cured epoxide compositions with and without the phosphite ester. Included also are results obtained on formulations containing conventional nonreactive plasticizers in place of the phosphite ester.

TABLE B

| Formulation No. | Modifier | Amount, phr. | Curing agent | Amount, phr. | Epoxide resin (100 parts) | Power factor (percent) | | | | Dielectric constant | | | |
|---|---|---|---|---|---|---|---|---|---|---|---|---|---|
| | | | | | | Initial | | After 5 hrs. cure at 150° C. | | Initial | | After 5 hrs. cure at 150° C. | |
| | | | | | | 1,000 cycles | One mc. | 1,000 cycles | One mc. | 1,000 cycles | One mc. | 1,000 cycles | One mc. |
| 21 | None | | TEPA | 8 | Epon 828 | 0.24 | 1.2 | 0.44 | 2.6 | 4.7 | 4.6 | 4.6 | 4.3 |
| 22 | TPP | 5 | TEPA | 8 | do | 0.25 | 1.1 | 0.36 | 2.5 | 4.7 | 4.7 | 4.7 | 4.4 |
| 23 | TPP | 25 | TEPA | 8 | do | 0.21 | 1.1 | 0.21 | 1.4 | 4.2 | 4.4 | 4.1 | 4.0 |
| 24 | TPP | 50 | TEPA | 8 | od | 0.66 | 1.3 | 0.37 | 1.3 | 4.4 | 4.2 | 4.3 | 4.1 |
| 25 | TAPP | 25 | TEPA | 8 | do | 0.16 | 1.2 | 0.22 | 1.8 | 4.2 | 4.1 | 4.1 | 3.9 |
| 26 | TCP | 25 | TEPA | 8 | do | 0.24 | 0.79 | 0.23 | 1.3 | 4.1 | 4.1 | 4.1 | 3.9 |
| 27 | TBP | 5 | TEPA | 8 | do | 0.64 | 1.2 | 0.40 | 2.4 | 4.8 | 4.6 | 4.7 | 4.3 |
| 28 | 2 TPP/1 TBP¹ | 25 | TEPA | 8 | do | 0.52 | 1.1 | 0.25 | 1.4 | 4.3 | 4.2 | 4.3 | 4.1 |
| 29 | 1 TPP/2 TBP¹ | 25 | TEPA | 8 | do | 1.95 | 2.0 | 0.48 | 1.6 | 4.9 | 4.4 | 4.3 | 4.1 |
| 30 | None | | Shell U | 20 | do | 0.83 | 2.8 | 0.97 | 3.2 | 4.9 | 4.4 | 4.8 | 4.3 |
| 31 | TPP | 25 | do | 20 | do | 0.57 | 2.1 | 0.49 | 1.9 | 4.6 | 4.3 | 4.4 | 4.2 |
| 32 | None | | DEAPA | 8 | do | 0.31 | 2.2 | 0.38 | 2.7 | 4.4 | 4.2 | 4.3 | 4.0 |
| 33 | TPP | 25 | DEAPA | 8 | do | 0.18 | 1.4 | 0.14 | 1.4 | 4.1 | 4.0 | 4.1 | 40 |
| 34 | TAPP | 25 | DEAPA | 8 | do | 0.15 | 1.5 | 0.13 | 1.9 | 4.1 | 3.9 | 4.1 | 3.9 |
| 35 | None | | BPA | 20 | do | 0.13 | 1.4 | Melted | Melted | 4.9 | 4.8 | Melted | Melted |
| 36 | TPP | 25 | BPA | 20 | do | 0.20 | 1.0 | 0.09 | 1.1 | 4.2 | 4.2 | 4.2 | 4.1 |
| 37 | None | | PA | 40 | do | 0.16 | 1.3 | 0.13 | 1.3 | 4.4 | 4.2 | 4.4 | 4.3 |
| 38 | TPP | 25 | PA | 40 | do | 0.32 | 1.0 | 0.30 | 1.1 | 4.3 | 4.1 | 4.3 | 4.2 |
| 39 | TAPP | 25 | PA | 40 | do | 0.22 | 0.9 | 0.20 | 1.0 | 4.1 | 4.0 | 4.1 | 4.0 |
| 40 | None | | TEPA | 8 | ERL-2774 | 0.25 | 1.2 | 0.34 | 2.3 | 4.8 | 4.6 | 4.7 | 4.4 |
| 41 | TPP | 25 | TEPA | 8 | ERL-2774 | 0.22 | 1.0 | 0.21 | 1.4 | 4.2 | 4.2 | 4.2 | 4.0 |
| 42 | None | | TEPA | 8 | Epon 815 | 0.48 | 1.4 | 0.32 | 2.2 | 4.7 | 4.6 | 4.7 | 4.3 |
| 43 | TPP | 25 | TEPA | 8 | do | 0.54 | 1.1 | 0.25 | 1.3 | 4.2 | 4.1 | 4.2 | 4.1 |
| 44 | DBPh | 25 | TEPA | 8 | do | | | 2.00 | 3.5 | | | 5.0 | 4.0 |
| 45 | 2-EP | 25 | TEPA | 8 | do | | | 4.3 | 4.4 | | | 5.9 | 4.4 |

¹ Molar ratios.

NOTE.—The initial cure for Bisphenol-A containing compositions is 150° C. for two hours, for phthalic anhydride containing compositions is 150° C. for twenty-four hours, and for all others is 100° C. for thirty minutes. Formulations 35 and 36 included ca. 0.5% benzyl dimethyl amine.

LEGEND: TEPA—Tetraethylene pentamine; TPP—Triphenyl phosphite; TAPP—Tris-t-amylphenyl phosphite; TCP—Tricresyl phosphite. TBP—Tributyl phosphite; DBPh—Dibutyl phthalate; 2-EP—2-ethylhexyl diphenyl phosphite; DEAPA—Diethylamino-propylamine; Shell U—Aliphatic polyamine; BPA—Bisphenol-A; PA—Phthalic anhydride.

It is interesting to note that the power factor is improved in substantially all of the epoxide compositions to which there is added a phosphite ester. In the few cases where there is no improvement, it is either substantially the same or the difference is insignificant. A comparison of the epoxide compositions containing conventional nonreactive plasticizers with those containing the phosphite esters illustrates the marked improvement in power factor obtained. This difference is especially significant at one megacycle. The dielectric constant is not appreciably affected by the addition of either the non-reactive plasticizer or the reactive phosphite ester. Likewise, the specific resistivity is not affected by the addition of these materials, and since the difference between the modified and unmodified compositions are very small, the numerical results are not reported. It will be noted that by the addition of 25 phr. of triphenyl phosphite to the epoxide composition containing bisphenol "A" as a curing agent, the composition is not only stabilized (note that the control in this case melted on the 5-hour cure at 150° C.), but, in addition, the power factor of the cured composition is improved.

EXAMPLE 2

One hundred parts of an epoxide resin having an epoxide equivalent of 175–210 (Epon 828) are mixed with 25 parts of triphenyl phosphite and 3 parts of benzyl dimethyl amine. The resulting mixture is then coated on a glass plate and completely cured by heating at 150° C. for 1½ hours. After cooling, the resulting coated glass plate is then tested for adhesion of the coating by immersion in water, dilute alkali solutions and organic solvents, such as acetone and ethyl alcohol, for a period of 4 days. On removal from the liquids, the glass plate is dried and examined. The film does not whiten or soften and the adhesion is not impaired as a result of extended immersion in the above liquids.

Similar results are obtained when the triphenyl phosphite of this example is replaced by the following phosphite esters: Tricresyl phosphite, tri-(t-amylphenyl) phosphite, tris(3,5-dichlorocyclohexyl) phosphite, butyl diphenyl phosphite, tris(2,2,2-trichloroethyl) phosphite, and tris(β-naphthyl) phosphite.

EXAMPLE 3

A mixture of 125 parts of triphenyl phosphite and 100 parts of Epon 1004 (epoxide equivalent weight 870–1025) are dissolved in 200 parts of methyl ethyl ketone. To this solution is added 8 parts of tetraethylene pentamine. Films of 0.005 inch thickness, baked for approximately 1 hour at 100° C., give flexible, infusible products.

Similar results are obtained when the triphenyl phosphite is replaced by the following phosphite esters: tri-(2-ethylhexyl) phosphite, tri-(3,5-dimethylphenyl) phosphite, tri(octylphenyl) phosphite, n-octyl diphenyl phosphite, tri-benzyl phosphite, and tri-isooctyl phosphite.

EXAMPLE 4

A hardenable, filling composition is prepared by mixing 400 parts of an epoxide resin having an epoxy equivalent weight of 175–210 and 375 parts of triphenyl phosphite. To this is added 200 parts of calcium carbonate, 30 parts of wood flour, and 32 parts of tetraethylene pentamine, and the mixture is then passed through a three-roll paint mill until a homogeneous product of smooth consistency is obtained. The resulting product cures completely to a solid homogeneous state without undergoing any substantial volume shrinkage upon heating at a temperature of 150° C. for 2 hours.

Examples of suitable formulations combined in a way similar to that in the preceding example include:

EXAMPLE 5

| | Parts |
|---|---|
| Epoxide resin (glycidyl) polyether of bis(4-hydroxyphenyl) 2,2-propane, epoxy equivalent weight 175–210) | 600 |
| Kaolin | 50 |
| Calcium carbonate | 200 |
| Titanium dioxide | 50 |
| Maleic anhydride | 100 |
| Diethylamino propylamine | 50 |
| Tricresyl phosphite | 450 |
| Triallyl phosphite | 100 |

EXAMPLE 6

Epoxide resin (glycidyl polyether of bis(4-hydroxyphenyl) 2,2-propane, epoxy equivalent weight 450–525) _____ 500
Kaolin _____ 300
Asbestos fibers _____ 50
Phthalic anhydride _____ 50
m-Phenylenediamine _____ 50
Butyldiphenyl phosphite _____ 475

EXAMPLE 7

Epoxide resin (glycidyl polyether of bis(4-hydroxyphenyl) 2,2-propane, epoxy equivalent weight 225–290) _____ 400
Calcium carbonate _____ 100
Titanium dioxide _____ 40
Triethanolamine borate _____ 50
Phenyldicresyl phosphite _____ 400

EXAMPLE 8

In this example, 100 parts each of two epoxide resins, Epon 828 and Epon 815, are each mixed with 50 and 100 parts, respectively, of a phosphite ester. Forty parts of phthalic anhydride are then added and the resulting mixture cured at 150° C. for 24 hours. Control samples are prepared in a similar manner by omitting the phosphite ester. The flammability of the cured compositions is reported in Table C below.

A portion of each sample is then immersed in each of the following solutions for a period of 96 hours: water at 50° C. 5% NaOH at 50° C., water at room temperature, and 5% NaOH at room temperature. In each case there is an insignificant gain in weight, the numerical results being in the same order of magnitude, so that it is apparent that the reactive diluents tested have no adverse effect on the chemical resistance of the epoxide resin.

TABLE D

| Reactive diluent | Phr. | Shore Hardness ("D" scale, 10 seconds) | | Compressive yield strength (p.s.i.) | Heat distortion temperature (° C.) |
| --- | --- | --- | --- | --- | --- |
| | | Initial cure | Final cure | | |
| Control | 0 | 84 | 88 | 17,750 | 61 |
| Phenyl glycidyl ether [1] | 20 | 84 | 88 | 16,850 | 58 |
| Allyl glycidyl ether [1] | 10 | 80 | 87 | 14,800 | 56 |
| Triphenyl phosphite | 25 | 86 | 89 | 19,200 | 65 |
| Do | 50 | 75 | 87 | 14,000 | 51 |

[1] In each case, additional amounts of tetraethylene pentamine equivalent to the glycidyl ether diluent are added.

From the foregoing results obtained, it is apparent that the addition of both the phenyl glycidyl ether and the allyl glycidyl ether had an adverse affect on all prop-

TABLE C

| | Sample Number | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| Epon 815 | 100 | 100 | 100 | 100 | 100 | | | | | |
| Epon 828 | | | | | | 100 | 100 | 100 | 100 | 100 |
| Phthalic anhydride | 40 | 40 | 40 | 40 | 40 | 40 | 40 | 40 | 40 | 40 |
| Triphenyl phosphite | | 50 | 100 | | | | 50 | 100 | | |
| Tricresyl phosphite | | | | 50 | 100 | | | | 50 | 100 |
| Flammability of cured product [1] | BE | SE | SE | SE | SE | BE | BS | BS | BS | BS |

[1] LEGEND: BE—Burns easily; BS—Burns slightly; SE—Self-extinguishing.

It is thus apparent from the foregoing example that epoxide resins containing phthalic anhydride as a curing agent, which are known to undesirably support combustion, may be significantly improved by adding a phosphite ester to the composition.

EXAMPLE 9

In this example, 100 parts of Epon 828 and 8 parts of tetraethylene pentamine are mixed with various reactive diluents. The control, of course, consists only of the epoxide resin and the curing agent. Each sample is cured at 100° C. for a period of 30 minutes and then tested for hardness on a Shore Durometer ("D" scale for 10 seconds). Each sample is then subjected to an additional cure at 100° C. for 3 hours. Each sample is tested again for hardness and then for its compressive yield strength (ASTM method D–695–54) and heat distortion point (ASTM D–648–45T). The results of these tests are reported in Table D below.

erties tested, while the addition of 25 parts of triphenyl phosphite improved all the properties of the epoxide composition. Moreover, the properties are not affected until 50 parts of triphenyl phosphite are added, and even then they are essentially equivalent to the properties of the composition containing only 10 parts of allyl glycidyl ether.

EXAMPLE 10

The formulations listed below are prepared by adding the 25 parts of phosphite ester and 8 parts of tetraethylene pentamine to 100 parts of epoxide resin (Epon 828, epoxide equivalent weight 175–210). The resulting mixture is agitated thoroughly, poured into a plate glass mold, coated with a standard mold release agent and then cured for a short time. The hardness is then measured using a standard instrument. In some instances the samples are post cured for a longer period of time and tested again for hardness.

TABLE E

| Phosphite ester | Shore Hardness, ("D" scale) | |
|---|---|---|
| | ½ hr. at 100° C. | 19 hrs. at 100° C. |
| Control | 85 | |
| Tri(p-chlorophenyl) phosphite | 85 | |
| Di(tridecyl) hydrogen phosphite | 79 | |
| Diphenyl hydrogen phosphite | 80 | |
| Tri(p-tert. butyl phenyl) phosphite | 85 | |
| Decyl diphenyl phosphite | 85 | |
| 2-ethylhexyl diphenyl phosphite (molar mixture of 72% triphenyl phosphite and 38% 2-ethylhexyl diphenyl phosphite) | 77 | |
| Tri(3,5-dimethylphenyl) phosphite | 95.5 | |
| Bis(β-chloroethyl) (1-hydroxyethyl) phosphonate, bis(β-chloroethyl) phosphite ester | 43 | 88 |
| Bis(β-chloroethyl) (α-hydroxybenzyl) phosphonate, bis(β-chloroethyl) phosphite ester | 43 | 86 |
| Bis(2-chloroethyl) (1-hydroxyethyl) phosphonate diphenyl phosphite | 57 | 106 |

| | Hardness Rockwell "M" | |
|---|---|---|
| | After 30 min. at 100° C. | After 20 hrs. at 100° C. |
| Control | 74 | 102 |
| Tetra(diphenyl phosphite) pentaerythritol | 97 | |
| Tetraphenylethylene diphosphite | 95 | |
| Tricresyl phosphorotrithioite | 89 | 99 |
| 1,3-diphenoxy-2-propyl diphenyl phosphite | 90 | 101 |
| 2,2,2-trichloroethyl diphenyl phosphite | 94 | 110 |
| Phenyl bis-(2,2,2-trichloroethyl) phosphite | 92 | 112 |
| Tris(2,2,2-trichloroethyl) phosphite | 81 | 115 |
| Tri(butenylphenyl) phosphite | 92 | 107 |

It should be noted that the last six compounds in the above table have (R—X—) moieties which are derived from alcohols having an acid dissociation constant (Ka) which is above $1 \times 10^{-13}$. For example, phenol has Ka value of $1.3 \times 10^{-10}$; thiophenol has a Ka value of $1 \times 10^{-7}$ and trichloroethanol has a Ka value of $1.6 \times 10^{-12}$. From the results obtained it is evident that phosphites containing such (R—X—) moieties yield especially valuable epoxide resin compositions.

EXAMPLE 11

The formulations listed below are prepared by mixing the indicated amounts of curing agent and the specific flexibilizing modifier with 100 parts of an epoxide resin (Formulations 2 and 4 containing triphenyl phosphite in addition to the other ingredients). The resulting mixture is then agitated thoroughly, poured into a plate glass mold (⅛") and then allowed to cure at room temperature for seven days. The hardness is then measured using a standard instrument manufactured by the Rockwell Instrument Company.

TABLE F

| | 1 | 2 | 3 | 4 |
|---|---|---|---|---|
| Epon 828 | 100 | 100 | 100 | 100 |
| TPP | | 25 | | 25 |
| Versamide 125 [1] | 100 | 100 | | |
| Thiokol LP-3 [2] | | | 100 | 100 |
| Diethylene triamine | | | 12 | 8 |

[1] A polyamide modifier manufactured by General Mills Inc.
[2] A polysulfide modifier manufactured by Thiokol Chemical Corp.

TABLE G

| | Rockwell Hardness | | | |
|---|---|---|---|---|
| | "M" scale | | "R" scale | |
| Time elapsed | 1 | 2 | 3 | 4 |
| 7 days | 47 | 44 | −72 | |
| 10 dyas | | | | −35 |
| 12 days | 46 | | −65 | |
| 60 days | 40 | 38 | −79 | −32 |

Formulations 1 and 3 are extremely viscous and difficult to pour, whereas Formulations 2 and 4 can be readily poured into the plate glass mold. Aside from the layup stage viscosity improvements realized by the incorporation of triphenyl phosphite into the above compositions, it will be noted that the flexibility characteristics (including the ability of the cured resin to retain the flexibility) is not altered in the case of the Versamid 125 modified epoxide composition. In the case of the Thiokol LP-3 modified epoxide composition the difference in flexibility effected by the addition of the triphenyl phosphite is not really significant, since the TPP modified epoxide resin composition is still flexible.

EXAMPLE 12

An epoxide composition is prepared by mixing 100 parts of Epon 828 and 1.2 parts of diethylene triamine (#1). A second composition is prepared by mixing 100 parts of Epon 828, 0.8 parts of diethylene triamine and 25 parts of triphenyl phosphite (#2).

Cold rolled steel, 3" x 6" x 0.037" is cut into 1" x 6" strips and the ends burred with a file. The steel is then pickled (one minute in 10% HNO₃, 10 minutes in 50% HCl). The steel strips are then coated with the particular epoxide composition so that the bars are bonded together with a ½" lap using a tablet paper spacer.

1" x 5" x ⅛" aluminum bars are etched for ten minutes in chromic acid solution (10 parts H₂SO₄, 1 part Na₂Cr₂O₇, 30 parts water) at 150° F. Formulations #1 and #2 are then used to bond these aluminum bars together with a ½" lap.

The results obtained in each case are set forth below:

TABLE H

| Steel: | Shear strength,[1] p.s.i. |
|---|---|
| #1 | 2000 |
| #2 | 3060 |
| Aluminum: | |
| #1 | 1880 |
| #2 | 2590 |

[1] ASTM—Method D-1002-53T, employing an Instron tester (E-cell 2000 # full scale at 0.05 inch per min. crosshead and 5" per min. chart speed).

The experiment with the aluminum bars is repeated except that 1.35 parts of butyl glycidyl ether is added to Formulation No. 1. The lap shear strength for this formulation (#3) is 2010 p.s.i.

The above results demonstrate the improvement in bond strength which is imparted by the addition of triphenyl phosphite to amine cured-epoxide resin compositions.

EXAMPLE 13

The formulations listed below are prepared by mixing the indicated amounts of the respective ingredients. The resulting mixture is then poured into an aluminum foil mold (½" deep) and then cured at 100° C. for 1½ hours. The hardness is then measured.

TABLE I

|  | 1 | 2 | 3 | 4 |
|---|---|---|---|---|
| Epon 828 | 100 | 100 | 100 | 100 |
| Triphenyl phosphite |  | 25 |  | 25 |
| Diethylene triamine | 8 | 8 | 12 | 12 |

TABLE J

|  | 1 | 2 | 3 | 4 |
|---|---|---|---|---|
| "M" scale |  |  |  |  |
| Rockwell Hardness | 80 | 90 | 93 | 78 |

The above results demonstrate that triphenyl phosphite modified epoxide resin compositions require less hardener to obtain a hard cured resinous product.

EXAMPLE 14

Epoxide compositions containing epoxide resin materials prepared by the peracid method are prepared by mixing the indicated amounts of the respective ingredients listed in Table K below. The resulting mixtures are poured into an aluminum foil mold (⅛") and then cured. Each formulation is subjected to an initial cure of 120° C. for 3 hours and 40 minutes and a post cure of 160° C. for 3 hours.

TABLE K

|  | 1 | 2 | 3 | 4 |
|---|---|---|---|---|
| Epoxide 201 (epoxide equiv. weight −140) [1] | 100 | 100 |  |  |
| Limonene dioxide (epoxide equiv. weight −84) [2] |  |  | 100 | 100 |
| Triphenyl phosphite |  | 25 |  | 25 |
| Diethylene triamine | 20 | 15 | 36 | 32 |

[1] Manufactured by Union Carbide Chemicals Company.
[2] Manufactured by Food Machinery Chemical Corp.

Formulations 2 and 4 yield clear, hard resinous products before the end of the curing cycle, whereas formulations 1 and 3 required the full curing cycle. Throughout the initial cure period it is evident that formulations 2 and 4 (which contain the triphenyl phosphite) harden at a faster rate than the unmodified formulations.

EXAMPLE 15

As further illustrative of this invention, compositions comprising respectively,

|  | 1 | 2 | 3 | 4 | 5 | 6 |
|---|---|---|---|---|---|---|
| Epon 828 | 100 | 100 | 100 | 100 | 100 | 100 |
| Triphenyl phosphite |  | 25 |  | 25 |  | 25 |
| Shell Z [1] | 20 | 15 |  |  |  |  |
| ZZLO 814 [2] |  |  | 26 | 18 |  |  |
| Duomeen S [3] |  |  |  |  | 70 | 60 |

[1] An aromatic amine mixture manufactured by Shell Chemical Corp.
[2] An aliphatic amine-ethylene-oxide adduct manufactured by Union Carbide Chemicals Co.
[3] A soya fatty acid-propylene diamine reaction product manufactured by Armour Co.

are prepared by mixing the epoxide resin with the respective ingredients in the amounts set forth above. The resulting mixture is poured into an aluminum foil mold and then cured. The curing cycle for each formulation is as follows:

Curing cycle

| Formulation: | Temp. (° C.) | Time | Remarks |
|---|---|---|---|
| 1 | 150 | 2 hrs | Rockwell "M"—110. |
| 2 | 150 | 2 hrs | Rockwell "M"—106. |
| 3 | 100 | 30 min | Seemed to emulsify, gassed when cured. |
| 4 | 100 | 30 min | Homogeneous mixture—cured well. |
| 5 | (1) | (1) | Sticky resinous product. |
| 6 | (1) | (1) | Resinous product stiffer than 5. |

[1] Room temp. for 20 hrs., then 2 hrs. at 150° C.

EXAMPLE 16

Twenty-five parts of triphenyl phosphite and 100 parts of Epon 828 are thoroughly mixed and the mixture is then flow-coated on each of two glass plates. One specimen is air dried for two hours at 100° C. and the other is air dried at room temperature (25° C.) for 16 hours. In each instance the fluid coatings are converted to tacky, non-fluid resinous films having good adhesive properties. The hardening of this coating may be accelerated by adding as little as 0.18 part of water to the epoxide resin-phosphite ester mixture.

Thus it is evident, that for certain purposes, e.g. in the formation of thin films or coatings, a curing agent may be omitted from the compositions of the invention and hardening effected by drying at ordinary or elevated temperatures, particularly in the presence of moisture.

The compositions of the invention comprising an epoxide resin and the phosphite ester may be prepared, as indicated by the foregoing examples, simply by admixing the several components. In general, the separate components may be admixed in any desired order and, if desired, combinations of two or more of the components (if there are more than two) may be prepared initially and any remaining components added subsequently. When a curing agent is to be incorporated, it may be desirable to add this component just prior to use, particularly if the curing agent renders the composition readily curable at or near room temperature. In the case of certain phosphite esters, e.g. alkyl phosphites, it may be desirable to warm the phosphite ester-epoxide resin mixture to effect complete solution thereof. Thereafter, however, the mixture may be cooled to room temperature and still remain homogenous.

Aromatic phosphites generally admix at room temperature with epoxide resins to form homogenous mixtures, i.e. the two components are completely miscible with each other without the application of heat. In the case of certain of the phosphite esters, e.g. alkyl phosphites in which the alkyl groups contain more than four carbon atoms, the presence of other components, e.g. a liquid curing agent, may be necessary to effect complete solution with or without the application of heat.

While in general it is desirable that the compositions comprising the epoxide resin and the phosphite ester be homogeneous, i.e. form a single phase, useful products can be obtained even though the phosphite ester is not completely in solution, particularly when the composition is to be heat hardened in the form of a thin film or is so formulated as to cure rapidly and before appreciable coalescence of any dispersed phase can occur.

It will be appreciated by those skilled in the art that the choice and amount of the various components of the compositions of the invention will be subject to adjustment and correlation, and thusly, will depend on the use for which the composition is intended and the result desired, e.g. the type and amount of epoxide resin, the phosphite ester, curing agent (if any), etc. These factors in turn are subject to adjustment and correlation with the procedure for preparing the complete compositions, e.g. order of mixing, etc.

Generally, amounts of phosphite ester in the range of 5 to 150 parts per 100 parts by weight of epoxide resin may be used, however, amounts above or below may be used where desired, e.g. from about 2 to about 200. Amounts in the range from about 5 to about 40 parts of phosphite ester give particularly desirable results in most applications.

In some cases it may be desirable to include conventional non-volatile solvents or liquid reactive solvents, such as those previously mentioned depending on the properties desired in the final product. Thus, such materials may serve to impart homogeneity to the mixture of epoxide resin and the phosphite ester when these two components are not completely miscible with each other and homogeneity is desired. However, non-volatile components used in the compositions of the invention which are miscible with the epoxide resin-phosphite ester mixture, e.g. components other than miscible fillers and coloring materials, are usually present in minor amounts and the epoxide resin-phosphite ester mixture is predominant in amount, i.e. amounts to more than 50% by weight and preferably 75–100% by weight of the total of the sum of the epoxide resin, the phosphite ester and other non-volatile miscible components.

For certain applications e.g. surface coating, the mixture can be dissolved in solvents, such as toluene, acetone, methylethyl ketone, dioxane, ethylene dichloride, butyl acetate, propylene oxide, etc.

The new epoxide compositions, made with phosphite esters in suitable proportions, form valuable protective layers and films when used either as clear varnishes or as pigmented varnishes, enabling infusible films to be obtained, which possess remarkable chemical resistance and other desirable properties, including high adherence to glass, plastics, ceramics, metal, and other hard-to-coat surfaces. Thus, they are useful in the lamination of wood to form plywood, in metal lamination, and particularly so, in glass lamination where the clarity of the adhesive is critical.

These compositions are also useful in impregnating wood and fabrics and in making self-sustaining films and filaments.

Since the compositions of the present invention possess remarkable electrical properties in addition to extremely low volume shrinkage, high chemical and moisture resistance, high flexibility and good structural strength, they are especially useful as filling compositions for potting and casting applications, as in casting small transformers and in casting leads. The compositions are also useful as oil seals and as insulation for motor windings.

The following compounds are given as further examples of phosphite esters which may be employed in the compositions of this invention, and it will be understood that such compounds can be used in place of the various compounds specifically shown in the foregoing detailed examples:

Tri(2,2,2-trifluoroethyl)phosphite
Tri(1H,1H,5H-octafluoro-1-pentyl)phosphite
S,S-dicresyl-o-phenyl phosphorodithioite
Tribenzyl phosphorotrithioite
O-(p-xylyl)-S,S-diphenyl phosphorotrithioite
Furfuryl diphenyl phosphite
Thenyl bis(3,4-dichlorophenyl)phosphite
O-decyl-S,S-dicresyl phosphorodithioite
S-(2-ethylhexyl)-O,O-diphenyl phosphoromonothioite
Triphenyl phosphorotrithioite
Tris(2,2,2-trichloroethyl)phosphorotrithioite
Tetra-(2-chlorophenyl)ethylene diphosphite
Tetra(3-bromophenyl)ethylene diphosphite
Tetra(2-methylphenyl)ethylene diphosphite
Tetra(2-methoxyphenyl)propylene diphosphite
Tetra(2,α-naphthoxy phenyl)ethylene diphosphite
Tetra(2-nitrophenyl)ethylene diphosphite
Tetraphenyl-1,2-dimethylethylene diphosphite
1,1-(diphenyl)-2,2-di-(2-methylphenyl)ethylene diphosphite
Tetraphenyl propylene diphosphite
Tetra(dicresyl phosphite)pentaerythritol
Tetra[bis(4-chlorophenyl)phosphite]pentaerythritol
Ethylene phenyl phosphite
Ethylene 2-methoxyphenyl phosphite
(2-methyl-5-isopropylphenyl)di-2-chlorophenyl phosphite
Tri(methoxyphenyl)phosphite
Tri(3,4-dihydroxyphenyl)phosphite
Tri(4-chlorophenyl)phosphite
Tri(ethoxyethyl)phosphite
Tri(phenylpropyl)phosphite
Tributenyl phosphite
Tripentenyl phosphite
Tri(phenylethyl)phosphite
Tri(butoxyethyl)phosphite
Di(β-chloroethyl)phenyl phosphite
Butyl diallylphosphite
Ethylene phenylphosphite(2-phenoxy-1,3,2-dioxaphospholane)
4-chloromethyl-2(2′-chlorododecyloxy)-1,3,2-dioxaphospholane
Tris(phenylchloroethyl)phosphite
4-chloromethyl-2-allyloxychloroproxy-1,3,2-dioxaphospholane
2-(3-chloro)phenoxy-5,5-dimethyl-1,3,2-dioxaphosphorinane
2-phenoxy-4,4,6-trimethyl-1,3,2-dioxaphosphorinane
Tris(α-naphthyl)phosphite
Tris(β-naphthyl)phosphorotrithioite
2-beta-naphthoxyphenyl-diphenylphosphite
1-methylethylene phenyl phosphite
1-methylethylene-2-chlorophenyl phosphite
Ethylene-4-methoxyphenyl phosphite
Ethylene-3,5-dimethylphenyl phosphite
Ethylene-4-iodophenyl phosphite
Ethylene-3-bromophenyl phosphite
Ethylene-2-phenoxyphenyl phosphite
Tetra(2-phenoxyphenyl)ethylene diphosphite
Tris(monylphenyl)phosphite
Tris(iododecylphenyl)phosphite
Tri(3,5-dimethoxyphenyl)phosphorotrithioite.

While this invention has been described with respect to certain embodiments, it is not so limited and it is to be understood that variations and modifications thereof may be made without departing from the spirit or scope of this invention.

What is claimed is:

1. An improved epoxide composition suitable for use in forming cured resinous products comprising (a) a predominant amount of the mixture of an epoxide resin containing at least one 1,2-epoxy group and at least about 2 parts by weight per 100 parts by weight of resin of a neutral ester of a phosphorus acid and (b) a curing agent free from BF$_3$-organic base complex for said epoxide resin.

2. The composition of claim 1 wherein said neutral ester has the structure.

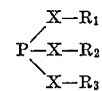

wherein R$_1$ and R$_2$ are organic radicals and R$_3$ is selected from the group consisting of hydrogen and an organic radical and X is a divalent chalkogen atom having an atomic weight of less than 35.

3. The composition of claim 2 wherein the neutral ester is triphenyl phosphite.

4. The composition of claim 1 wherein the curing agent is an amine or carboxylic acid anhydride.

5. The composition of claim 1 wherein the curing agent is a polycarboxylic acid anhydride.

6. The composition of claim 4 wherein the curing agent is a polyamine.

7. The process for preparing a cured epoxide resin composition which comprises mixing (a) a predominant amount of a mixture of an epoxide resin containing at least one 1,2-epoxy group and at least about 2 parts by weight per 100 parts by weight of resin of a neutral ester of a phosphorus acid and (b) a curing agent free from BF$_3$-organic base complex for said epoxide resin, and thereafter curing the mixture 8. The process of claim 7 wherein said neutral ester has the structure

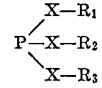

wherein R$_1$ and R$_2$ are organic radicals and R$_3$ is selected from the group consisting of hydrogen and an organic radical and X is a divalent chalkogen atom having an atomic weight of less than 35.

9. A process of claim 8 wherein the neutral ester is triphenyl phosphite.

10. The process of claim 7 wherein the curing agent is an amine or a carboxylic acid anhydride.

11. The process of claim 10 wherein the curing agent is a polyamine.

12. The process of claim 7 wherein the curing agent is a polycarboxylic acid anhydride.

13. The product obtained by curing the composition of claim 1.

14. The product obtained by curing the composition of claim 2.

15. The product obtained by curing the composition of claim 4.

16. The product obtained by curing the composition of claim 5.

17. The product obtained by curing the composition of claim 6.

References Cited

UNITED STATES PATENTS

| | | | |
|---|---|---|---|
| 2,686,771 | 8/1954 | Whitehill et al. | 260—47 E C |
| 2,786,794 | 3/1957 | Gams et al. | 260—47 E P |
| 2,788,337 | 4/1975 | Preiswerk et al. | 260—47 E C X |
| 2,894,923 | 7/1959 | Graham | 260—47 EN UX |
| 2,938,877 | 5/1960 | Mack | 260—941 X |
| 2,941,003 | 6/1960 | Shokal | 260—47 EN X |
| 3,352,826 | 11/1967 | McWhorter et al. | 260—47 EC |

WILLIAM H. SHORT, Primary Examiner

L. P. QUAST, Assistant Examiner

U.S. Cl. X.R.

260—2 EP, 2 EC, 30.4 EP, 30.6 R, 30.8 R, 31.2 R, 32.8 EP, 33.8 EP, 27 EP, 45.7 P, 47 EP, 59, 967; 117—124 E, 132 BE; 161—184, 185, 186